(12) United States Patent
Highland et al.

(10) Patent No.: US 7,716,112 B1
(45) Date of Patent: May 11, 2010

(54) SYSTEM AND METHOD FOR PRICE-BASED ANNOTATIONS IN AN ELECTRONIC TRADING ENVIRONMENT

(75) Inventors: Ryan J. Highland, Chicago, IL (US); Robert A. West, Chicago, IL (US); Peter F. Ziemkiewicz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1332 days.

(21) Appl. No.: 10/634,415

(22) Filed: Aug. 5, 2003

Related U.S. Application Data

(63) Continuation-in-part of application No. 10/260,644, filed on Sep. 30, 2002, now Pat. No. 7,610,237.

(51) Int. Cl.
    G06Q 40/00 (2006.01)
(52) U.S. Cl. ...................................................... 705/37
(58) Field of Classification Search ........................ None
    See application file for complete search history.

(56) References Cited

U.S. PATENT DOCUMENTS

| | | | |
|---|---|---|---|
| 5,241,657 A * | 8/1993 | Fine et al. ................... 345/501 |
| 6,058,379 A * | 5/2000 | Odom et al. .................. 705/37 |
| 6,134,535 A * | 10/2000 | Belzberg ................... 705/36 R |
| 6,195,647 B1 * | 2/2001 | Martyn et al. ............ 705/36 R |
| 6,484,156 B1 | 11/2002 | Gupta et al. |
| 6,625,583 B1 * | 9/2003 | Silverman et al. ......... 705/36 R |
| 6,772,132 B1 * | 8/2004 | Kemp et al. ............... 705/36 R |
| 7,054,812 B2 | 5/2006 | Charlesworth et al. |
| 7,103,556 B2 * | 9/2006 | Del Rey et al. ................. 705/1 |
| 7,127,424 B2 | 10/2006 | Kemp et al. |
| 7,219,077 B1 * | 5/2007 | Black et al. .................... 705/37 |
| 7,236,946 B2 * | 6/2007 | Bates et al. .................... 705/26 |
| 7,243,301 B2 * | 7/2007 | Bargeron et al. ............ 715/205 |
| 7,426,489 B2 * | 9/2008 | van Soestbergen et al. .... 705/37 |
| 7,487,112 B2 * | 2/2009 | Barnes, Jr. .................... 705/26 |
| 2001/0042037 A1 * | 11/2001 | Kam et al. .................... 705/36 |
| 2001/0042098 A1 | 11/2001 | Gupta et al. |
| 2002/0059342 A1 | 5/2002 | Gupta et al. |
| 2002/0083094 A1 | 6/2002 | Golovchinsky et al. |
| 2002/0091679 A1 * | 7/2002 | Wright .......................... 707/3 |

(Continued)

OTHER PUBLICATIONS

Alpert, Henry; Keeping Track: Bank Brokerage Clients Wants Statements that are Information Intensive Yet Easy to Understand, Bank Investment Marketing; pp. 65-68; Feb. 1999.*

(Continued)

*Primary Examiner*—Hani Kazimi
*Assistant Examiner*—Virpi H Kanervo
(74) *Attorney, Agent, or Firm*—McDonnell Boehnen Hulbert & Berghoff LLP

(57) ABSTRACT

A system and method for generating and displaying annotations in relation to one or more prices corresponding to trader-related or market related events are described. In one embodiment, a trader may enter an annotation to be displayed in relation to one or more price levels. Alternatively, a trader may configure a dynamic annotation to be dynamically displayed in relation to some price level(s) upon detecting a predetermined event related to one or more tradeable objects. Also, a trader may configure one or more alarms to be displayed or played in combination with the annotations.

22 Claims, 6 Drawing Sheets

U.S. PATENT DOCUMENTS

| | | |
|---|---|---|
| 2002/0099552 A1 | 7/2002 | Rubin et al. |
| 2002/0130868 A1* | 9/2002 | Smith ......................... 345/440 |
| 2002/0186236 A1 | 12/2002 | Brown et al. |
| 2003/0004853 A1* | 1/2003 | Ram et al. .................... 705/37 |
| 2003/0009411 A1 | 1/2003 | Ram et al. |
| 2003/0018569 A1* | 1/2003 | Eisenthal et al. .............. 705/37 |
| 2003/0110124 A1* | 6/2003 | Escher ........................ 705/38 |
| 2004/0059634 A1* | 3/2004 | Tami et al. ................... 705/17 |
| 2004/0093349 A1* | 5/2004 | Buinevicius et al. ..... 707/104.1 |
| 2005/0081159 A1* | 4/2005 | Gupta et al. ................ 715/751 |

OTHER PUBLICATIONS

Telescan Introduces Expanded market Commentary on Wall Street City Supersite; PR Newswire; p. 7423; Sep. 23, 1998.*

Lotus Launches NotesView—Graphical management Product for Lotus Notes Enterprises; M2 Presswire; Feb. 6, 1995.*

* cited by examiner

SYSTEM AND METHOD FOR PRICE-BASED ANNOTATIONS IN AN ELECTRONIC TRADING ENVIRONMENT

CROSS REFERENCE TO RELATED APPLICATIONS

This application is a continuation-in-part of U.S. patent application Ser. No. 10/260,644, filed on Sep. 30, 2002, entitled "System and Method for Creating Trade-Related Annotations in an Electronic Trading Environment," now U.S. Pat. No. 7,610,237, issued Oct. 27, 2009, the contents of which are fully incorporated herein by reference.

FIELD OF INVENTION

The present invention is directed towards electronic trading. More specifically, the present invention is directed towards providing means for creating annotations associated with prices and using the annotations as a basis to generate user alerts.

BACKGROUND

Trading methods have evolved from a manually intensive process to a technology enabled, electronic platform. With the advent of electronic trading, a user or trader can be in a virtually direct contact with the market, from practically anywhere in the world, performing near real-time transactions, and without the need to make personal contact with a broker.

Electronic trading is generally based on a host exchange, one or more computer networks and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the conditions associated with the order, for example price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchanges can offer other types of market information such as the last traded price (LTP), the last traded quantity (LTQ), and order fill information.

The success of a trader who trades in a competitive electronic trading environment depends on many factors. One of the most important factors is how fast a trader can make a trade. Another important factor is the ability of a trader to predict market trends and develop his/her trading strategies. Some traders keep journals to document their trading activities and/or market trends during a particular trading day or a number of trading days to observe market trends. Using such a journal and assuming that the information in the journal is kept up to date, a trader may view past market trends and his/her own performance hoping to predict future market trends and to avoid previous negative trading strategies. However, it might be difficult for a trader to view his notes related to important market events from one or more previous trading days while concentrating on trading in a volatile market, for example.

Thus, it is still desirable for electronic trading applications to offer tools that can assist a trader in trading in an electronic trading environment, help making profitable trades in a speedy and accurate manner, while allowing the trader to conveniently record and view any desirable information.

BRIEF DESCRIPTION OF THE DRAWINGS

Example embodiments of the present invention are described herein with reference to the following drawings, in which.

DETAILED DESCRIPTION

I. Annotation Interface Overview

Figure 1:
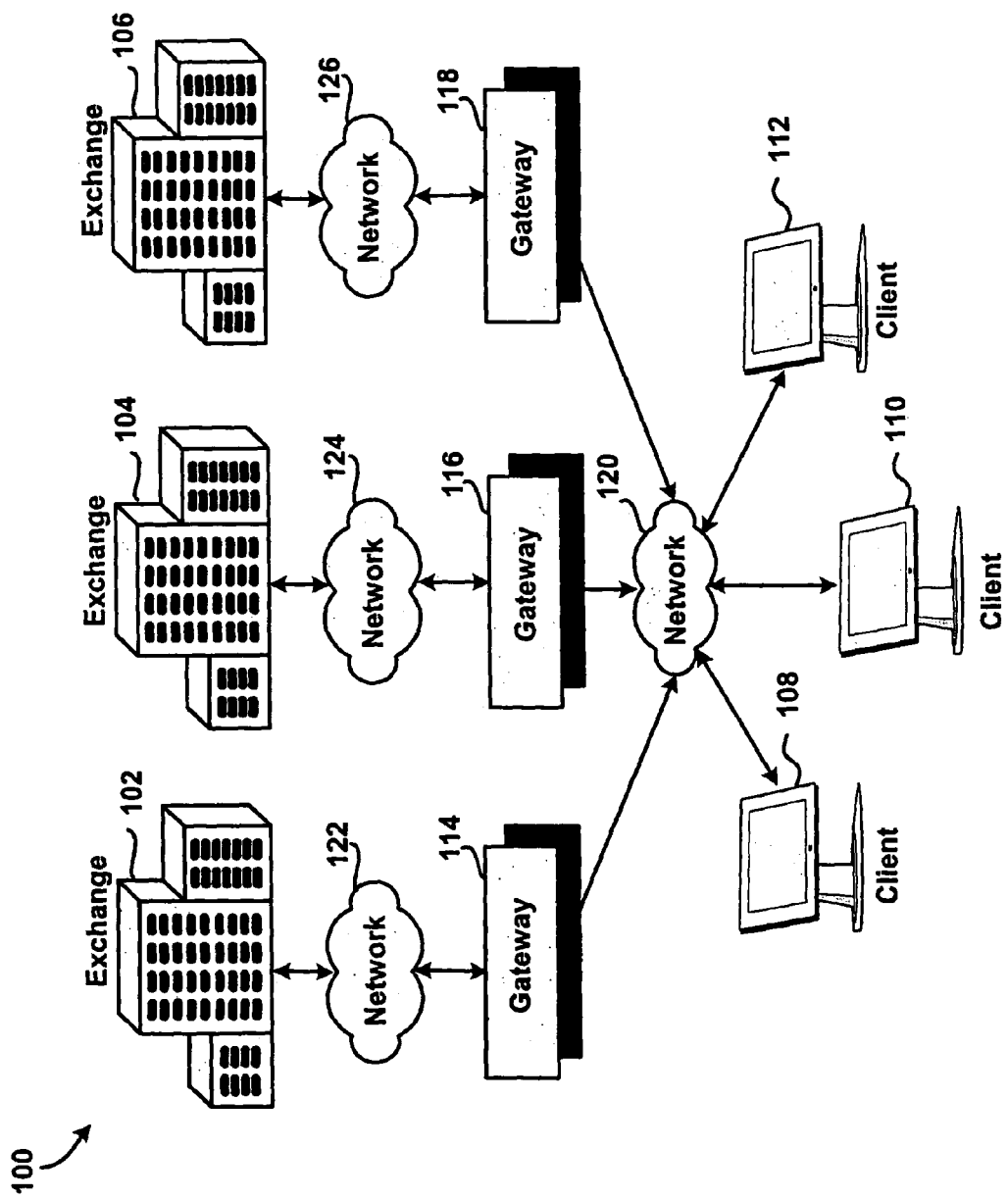
FIG. 1 is an example network configuration for a communication system utilized to access one or more exchanges.

As described with reference to the accompanying Figures, the present invention provides a trading interface that displays a plurality of user configurable annotations in relation to a plurality of price levels. In one embodiment, a trading interface may display a market information display region that includes a plurality of locations arranged such that each location corresponds to a price level of a first tradeable object being traded at one or more electronic exchanges. Then, the trading interface may receive an input to flag one or more annotations, each consisting of at least one price level associated with the tradeable object and one annotation occurrence of an event that can be manually entered or automatically generated. Once a trader enters an annotation, the annotation may be displayed in one or more locations corresponding to the flagged price levels.

For example, an annotation may correspond to a yesterday's high and may be displayed in relation to a price level corresponding to the yesterday's high. Alternatively, a trader may configure dynamic annotations that may be dynamically displayed in relation to one or more price levels upon detecting a predetermined event associated with a tradeable object. For example, a trader may configure an annotation to be displayed in relation to a price level associated with a first tradeable object upon detecting a predetermined event associated with a second tradeable object. It should be understood that the price level at which the automatic annotation is displayed may be determined based on any user-configurable conditions such as a current market level at the time when the annotation is generated. For example, a trader may configure an automatic annotation to be displayed in relation to a last traded price, or a midpoint between the inside market prices. Also, a user created annotation may be dynamically updated upon detecting an occurrence of a predetermined event associated with the annotation at some other price level. For example, an annotation corresponding to the Yesterday's High may be automatically updated at the end of the day to reflect the new Yesterday's High for the next trading session.

In addition to annotations, a trader could configure a number of alerts that may be played or displayed to a trader in combination with or independently of one or more annotations. For example, an alert may be configured as part of a dynamic annotation, and the alert may be triggered upon creating or updating the annotation. Alternatively, any annotation may be combined with an alert that may be activated when a current market reaches one or more price levels associated with the annotation. For example, a trader may wish to see or hear an alert upon a market reaching a yesterday's or last week's high price.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

FIG. 1 is a block diagram that illustrates an electronic trading system 100 in accordance with the preferred embodiments. The system 100 includes one or more exchanges 102, 104, 106 and one or more client devices 108, 110, 112. Intermediate devices such as gateways 114, 116, 118, routers (not shown), and other such types of client devices may be used to connect network 120 to networks 122, 124, 126 so that client devices 108, 110 and 112 and exchanges 102, 104, and 106 can communicate market information. It should be understood that the present invention is not limited to any particular system configuration. For example, networks 122, 124, and 126, or client devices 108, 110, 112 could connect separately to gateways 114, 116, 118. Of course, there are many other system configurations on which the preferred embodiments may be implemented.

A. Host Exchange

Host exchanges 102, 104, and 106 may represent electronic exchanges such as, for example, the London International Financial Futures and Options Exchange ("LIFFE"), the Chicago Board of Trade ("CBOT"), the New York Stock Exchange ("NYSE"), the Chicago Mercantile Exchange ("CME"), the German stock exchange-Exchange Electronic Trading ("Xetra"), or the European Exchange ("Eurex"), or any other exchange, which may include basic to more complex systems that automatically and electronically match incoming orders. These example exchanges and other exchanges are well known in the art. Communication protocols required for connectivity to one of these exchanges are also well known in the art.

Exchanges 102, 104, 106 allow traders to log onto a market to trade tradeable objects. As used herein, the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and metals. The tradeable object may be "real," such as products that are listed by an exchange for trading, or "synthetic," such as a combination of real products that is created by the user. A tradeable object could actually be a combination of other tradeable objects, such as a class of tradeable objects.

An exchange 102, 104, 106 can implement numerous types of order execution algorithms, and sometimes the type of algorithm depends on the tradeable object being traded. The preferred embodiments may be adapted by one skilled in the art of work with any particular order execution algorithm. Some example order execution algorithms include first-in-first-out and pro rata algorithms. The first-in-first-out (FIFO) algorithm that is used for some markets listed with Eurex, for example, gives priority to the first person to place an order. The pro rata algorithm that is used for some markets listed with LIFFE, for example, splits all orders for the same price. The present invention is not limited to any particular type of order execution algorithm.

Regardless of the type of order execution algorithm used, each exchange 102, 104, and 106 preferably provides similar types of information to subscribing devices 108, 110, and 112. Market information may include data that represents the inside market, which is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, the exchange usually provides the total buy quantity and the total sell quantity available in the market at a particular price level in its data feed. The extent of the market depth available to a trader usually depends on the exchange.

For instance, some exchanges provide market depth for all (or most) price levels, while some provide only quantities associated with the inside market, and others may provide no market depth at all. Additionally, the exchanges 102, 104, 106 can offer other types of market information such as the last traded price (LTP), the last traded quantity (LTQ), and order fill information.

B. Gateway

Gateways 114, 116, 118 are devices such as a mainframe, superminicomputer, minicomputer workstation, microcomputer that connect network 120 to networks 122, 124, 126 so that market information can be successfully passed between client devices 108, 110, 112 and exchanges 102, 104, 106. Gateways 114, 116, 118 preferably receive market information from the exchanges 102, 104, and 106 and convert it to a format compatible with the protocols used by the client devices 108, 110, 112 using conversion techniques known in the art. Also, as known by those skilled in the art, gateways 114, 116, 118 may have one or more servers to support data feeds, such as a price server for processing price information, an order server for processing order information, and a fill server for processing fill information. A trader at one of the client devices 108, 110, 112 can subscribe to price information, order information, and fill information for a particular market hosted at the exchanges 102, 104, and 106. The gateways 114, 116, and 118 also preferably receive transaction information, such as orders, order changes, queries, etc., from the client devices 108, 110, and 112, and forward that information to corresponding exchanges 102, 104, and 106.

C. Client Device

The client devices 108, 110, and 112 are devices that provide an interface for traders to trade at one or more markets listed with one, some, or all of the exchanges 102, 104, and 106. Some examples of client devices include a personal computer, laptop computer, handheld computer, and so forth. The client devices 108, 110, and 112, according to one preferred embodiment, include at least a processor and memory. The processor and memory, both well known computer components, are not shown in FIG. 1 for sake of clarity. Preferably, the processor has enough processing power to handle and process various types of market information. It should be understood that more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to processor for execution. Such a medium may take many forms, including but not limited to, non-volatile media, and transmission media. Non-volatile media include, for example, optical or magnetic disks, such as a storage device. Volatile media include dynamic memory, such as main memory or random access memory ("RAM"). Common forms of computer-readable media include, for example, a floppy disk, a flexible disk, a hard disk, a magnetic tape, or any other magnetic medium, a CD-ROM, any optical medium, punch cards, paper tape, any other physical medium with patterns of holes, a RAM, a PROM, and EPROM, a FLASH-EPROM, and any other memory chip or cartridge, or any other medium from which a computer can read.

The client devices 108, 110, and 112 receive market information from any of the exchanges 102, 104, and 106. According to the preferred embodiments, market information is displayed to the trader(s) on the visual output device or display device of the client devices 108, 110, and 112. The output device can be any type of display. For example, the display could be a CRT-based video display, an LCD-based or a gas plasma-based flat-panel display, a display that shows three-dimensional images, or some other display type. The present invention is not limited to any particular type of display.

Upon viewing the market information or a portion thereof, a trader may wish to send orders to an exchange, cancel orders in a market, query an exchange, and so on. To do so, the trader may input various commands or signals into the client devices 108, 110, and 112, for example, by typing into a keyboard, inputting commands through a mouse, or inputting commands or signals through some other input devices. Upon receiving one or more commands or signals, the client devices 108, 110, and 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from the client devices 108, 110, and 112 to the host exchange 102, for example, over the networks 120, 122, 124, and 126.

Figure 2:
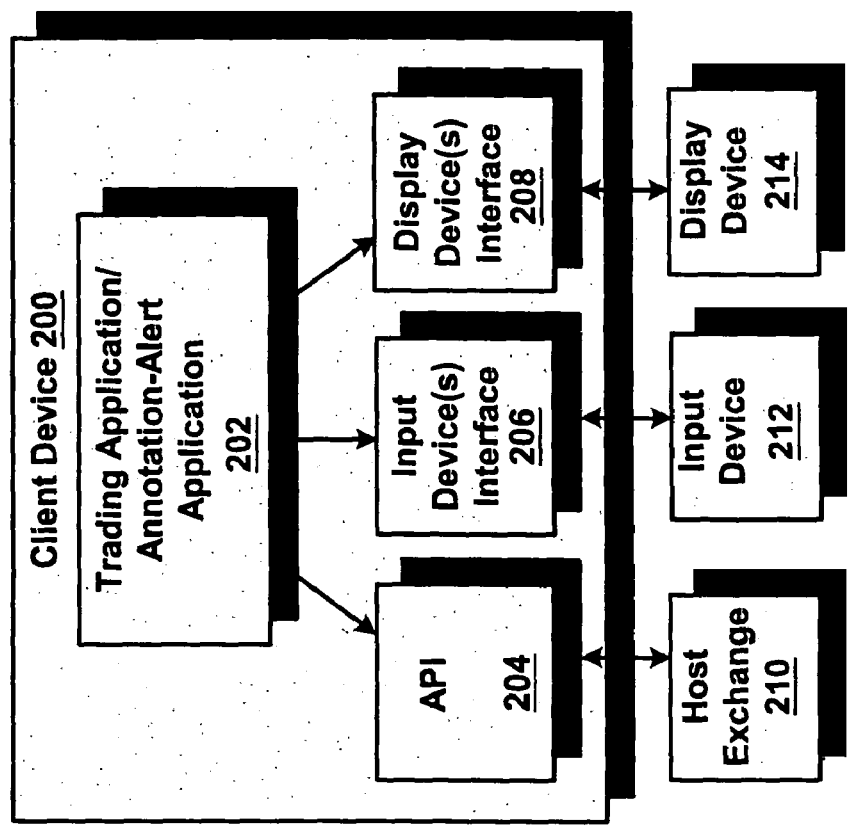
FIG. 2 is a block diagram of an example client device that may be used in a system such as the one shown in FIG. 1.

FIG. 2 shows an overview of an example client device 200 which may be similar to the type of client devices 108, 110, 112 shown in FIG. 1. The client device 200 can be any particular type of computing device, examples of which were enumerated above with respect to the client devices. According to the preferred embodiments, the client device 200 has a trading application 202 stored in memory that when executed arranges and displays market information in many particular ways, usually depending on how the trader prefers to view the information. The trading application 202 may also implement the preferred embodiments described herein. Alternatively, the preferred embodiments described herein may occur elsewhere such as outside of the trading application 202 on the client device 200, on a gateway, or on some other computing device. Preferably, the trading application 202 has access to market information through an API 204 (or application programming interface), and the trading application 202 can also forward transaction information to the exchange 210 via the API 204. Alternatively, the API 204 could be distributed so that a portion of the API rests on the client device 200 and a gateway, or at the exchange 210. Additionally, the trading application 202 may receive signals from the input device 212 via the input device interface 206 and can be given the ability to send signals to a display device 214 via a display device interface 208.

Also, as illustrated in FIG. 2, the trading application 202 includes an annotation application that may enable a trader to activate and use an annotation interface. For example, the annotation interface may allow a trader to input any desirable information into an annotation, link the annotation to any desirable price, or configure how and when the annotation should be dynamically updated or displayed in relation to a trading interface, the embodiments of which will be described in greater detail below. The trading application and annotation application may share commonly used information that is received from one or more exchanges or other sources, for example. Alternatively, the annotation application may be a separate and independent application from the trading application 202. In such an embodiment, the annotation application does not necessarily interact with the trading application 202; however, it may still share data with the trading application 202.

Even though, FIG. 2 illustrates the annotation interface being part of the client terminal 200, the annotation application may alternatively be installed on a server or a gateway that communicates with the client terminal 200. In such an embodiment, when a trader at the client terminal 200 subscribes to annotation services, the client terminal can access the annotation application over a computer network. Alternatively, portions of the annotation application may be installed on the server and/or gateway, and some portions may be installed on the client terminal 200. Such an embodiment may turn out especially beneficial when a client terminal has little processing power or not enough storage power. Those skilled in the art will understand that other embodiments are possible as well.

D. Trading Interface

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, now U.S. Pat. No. 6,772,132, issued Aug. 3, 2004, U.S. patent application Ser. No. 09/971,087, entitled "Click Based Trading With Intuitive Grid Display of Market Depth and Price Consolidation," filed on Oct. 5, 2001, now U.S. Pat. No. 7,127,424, issued Oct. 24, 2006, U.S. patent application Ser. No. 10/125,894, entitled "Trading Tools For Electronic Trading," filed on Apr. 19, 2002, now U.S. Pat. No. 7,389,268, issued Jun. 17, 2008, and U.S. patent application Ser. No. 10/376,417, entitled "A System and Method for Trading and Displaying Market Information in an Electronic Trading Environment," filed on Feb. 28, 2003, now U.S. Pat. No. 7,228,289, issued Jun. 5, 2007, the contents of each are incorporated herein by reference. Further, it should be understood that orders in the system illustrated in FIG. 1 could also be placed using any other automatic trading applications as well. Additionally, the preferred embodiments are not limited to any particular product that performs translation, storage and display functions.

III. Trader Created Dynamic Annotations and Alerts

As mentioned earlier, a client terminal consists of one or more computers (or software applications) that allow a trader to participate in the market being hosted at one or more electronic exchanges. More specifically, the client terminal uses one or more trading applications to create specialized trading interfaces that enable a trader to enter and execute orders. As will be described in greater detail below, an annotation application, in conjunction with a trading application, enables a trader to activate an annotation interface that provides means for a trader to record any market related or trader related information, or define a set of predetermined conditions/events that dynamically trigger generation of one or more annotations. Also, a dynamic annotation may be created for one tradeable object upon detecting a predetermined trigger associated with another tradeable object. In one embodiment, a dynamically created or user-created annotation may be combined with an alert that may be activated every time one or more conditions associated with the annotation are detected. For example, an alert may be played to a trader when a current market level reaches a predetermined price level associated with one or more annotations. It should be understood that an alert may take any format including audio and/or text messages, popup windows, or one or more indicators that may be displayed to a trader via a trading interface.

An annotation entered by a trader may be linked to one or more price levels and may be displayed in relation to those price levels via a trading interface. In such an embodiment, one or more prices are effectively flagged to correlate with a specific user-configurable event associated with one or more past trading sessions, a current trading session, or any future trading sessions. For example, a user-configurable event may include a yesterday's maximum or minimum price level, an average traded price range associated with one or more previous days, or one or more price levels corresponding to maximum order quantities that have been traded during one or more previous trading days at specific price levels or a range of price levels.

It should be understood, however, that the annotations may be related to market trends determined by a trader by observing the market. For example, a trader may enter annotations related to one or more market resistance points such as when the trader notices that the market bounces back and forth around some price level. As another example, a trader may enter an annotation to define that the market often crosses a predetermined price level only by a specific number of ticks.

In addition to configuring annotations in relation to predetermined price levels, a trader may also preset display rules defining when each annotation is displayed via a trading interface. For example, an annotation may be configured so that it is only displayed to a trader when a current market reaches a number of ticks away from the price level corresponding to the annotation. Alternatively, annotations may be displayed to a trader regardless of the market position and rather based on price levels that are viewable to a trader via a trading interface, the embodiments of which will be described in greater detail below.

A trader could also define a number of trader-related or market-related conditions or events corresponding to the same or different tradeable objects that may automatically trigger creation of one or more annotations and/or corresponding alerts. For example, market movements associated with two or more tradeable objects may be interrelated such that a market change associated with one tradeable object often causes market changes in one or more other tradeable objects. In such an embodiment, a trader can configure a number of conditions for one or more tradeable objects that may cause dynamic generation and display of an annotation in relation to a trading interface associated with another tradeable object. In one embodiment, the conditions may include detecting a predetermined market movement, detecting a new daily high/low price, or detecting a large quantity being traded at some price level associated with one or more tradeable objects. For example, a trader may configure an annotation to be dynamically created in relation to a trading interface associated with a first tradeable object upon detecting a market associated with a second tradeable object reaching a price level breaking a yesterday's high.

It should be understood that when an annotation is displayed in relation to a trading interface associated with a first tradeable object based on detecting a predetermined event associated with a second tradeable object, the annotation may be displayed in relation to any user-configurable price associated with the first tradeable object. In one embodiment, the annotation may be displayed in relation to the last traded price, any inside market price, the best bid or ask prices, or a mid-point between the best bid and ask prices associated with the first tradeable object at the time when the annotation is generated. Alternatively, a trader may configure a scaling factor that may be used to correlate prices between the two tradeable objects. In such an embodiment, the price level at which the annotation is displayed may be determined based on the last traded price of the second tradeable object at the time when a specific event has been detected, and further based on the scaling factor correlating the prices of the two tradeable objects. It should be understood that the tradeable objects could be traded at the same or different exchanges, and the tradeable object could be a user-configurable synthetic tradeable object made up of two or more tradeable objects.

In addition to market-specific events, a trader could also define a number of annotations that are based on theoretical market position values. For example, a trader could define one or more formulas that may be used to calculate various market related levels, such as theoretical positions of inside market prices. It should be understood that such theoretical values could be calculated based on data related to any number of markets that a trader considers to be related to the specific market for which the theoretical values are calculated. Also, annotations related to theoretical market data are preferably configured to expire after a predetermined period of time since the values for such annotations would be changing on periodical basis.

In addition to creating annotations, a trader could also define a number of alerts to be played or displayed via a trading interface when one or more market-related or trader-related conditions are detected. For example, in addition to displaying an annotation when one or more conditions are detected in relation to one or more tradeable objects, a trader may configure an alert to be played when such conditions are detected. Such alerts could be activated using a number of trigger levels including an alert to be activated when an annotation is within the display view or right above or below the highest/lowest price displayed via a trading interface. Also, a trigger level may depend on a location of the annotation compared to the last traded price, or any other user configurable price.

Also, a trader may wish to be notified when he is approaching his limit on any parameters that control the trader's ability to trade. Such alerts may be based on a maximum order quantity that a trader is allowed to trade, a maximum net position, a trader's credit limit, a trader's contract credit limit, or a maximum number of trades that the trader may make during a trading session, for example. However, it should be understood that different triggering events related to the trader could also be used.

Trader-configurable alerts could also be based on any user-configurable formulas. For example, a trader may define an alert to be activated upon determining a certain probability of some event happening. In one embodiment, a trader could define a formula that may be used for determining a probability of an order getting filled. Such a formula may be based on a total buy/sell quantity at an order price level, a total buy/sell order quantity at one or more prices in relation to the order price, and/or the estimated queue position of the trader's order, for example. A trader could then define an alert to be activated when the probability of an order getting filled reaches some user-configurable percentage, such as 90%, for example.

It should be understood that different formulas could also be used to define other events triggering one or more alerts. For example, a trader may define an alert to be activated when a predetermined working order quantity is detected at one or more price levels. In one embodiment, the activation of an alert may be limited to the embodiment where the predetermined order quantity stays at some price level for a preset time period, or is detected at some price level more than once during a predetermined time period. Also, a trader may wish to have an alert activated when the daily total traded volume associated with one or more tradeable object reaches a predetermined, user-configured level.

In addition to trader-related alerts and market-related alerts, a trader could define time-based alerts. Such alerts may be beneficial to a trader when some event that may possibly impact the market movement typically happens during a predetermined time period. For example, a trader may wish to be alerted at a predetermined time before an unemployment number or interest rates are typically released. To do that, a trader may configure an alert that may be activated at a predetermined time and deactivated at another user-configurable time. It should be understood that time-based alerts may have many different formats, including sound alerts, displaying one or more indicators in relation to a trading interface, or flashing/changing colors of trader's orders being displayed via the trading interface.

Additionally, as mentioned earlier, activation of an alert may dynamically trigger creation of an annotation having a description of the detected event. The created annotation may then be automatically linked to a predetermined price level and could be displayed in relation to that price level on a trading interface. Also, the alert may be configured so that it is automatically triggered every time a higher order quantity is detected at that price level, which may in turn dynamically update the annotation being displayed in relation to the price level. It should be understood that actions taken in relation to alerts and annotations may depend on user configuration. For example, rather than updating the annotation every time a higher order quantity is detected, the annotation may be updated only when the quantity increases by a predetermined amount.

Figure 3:
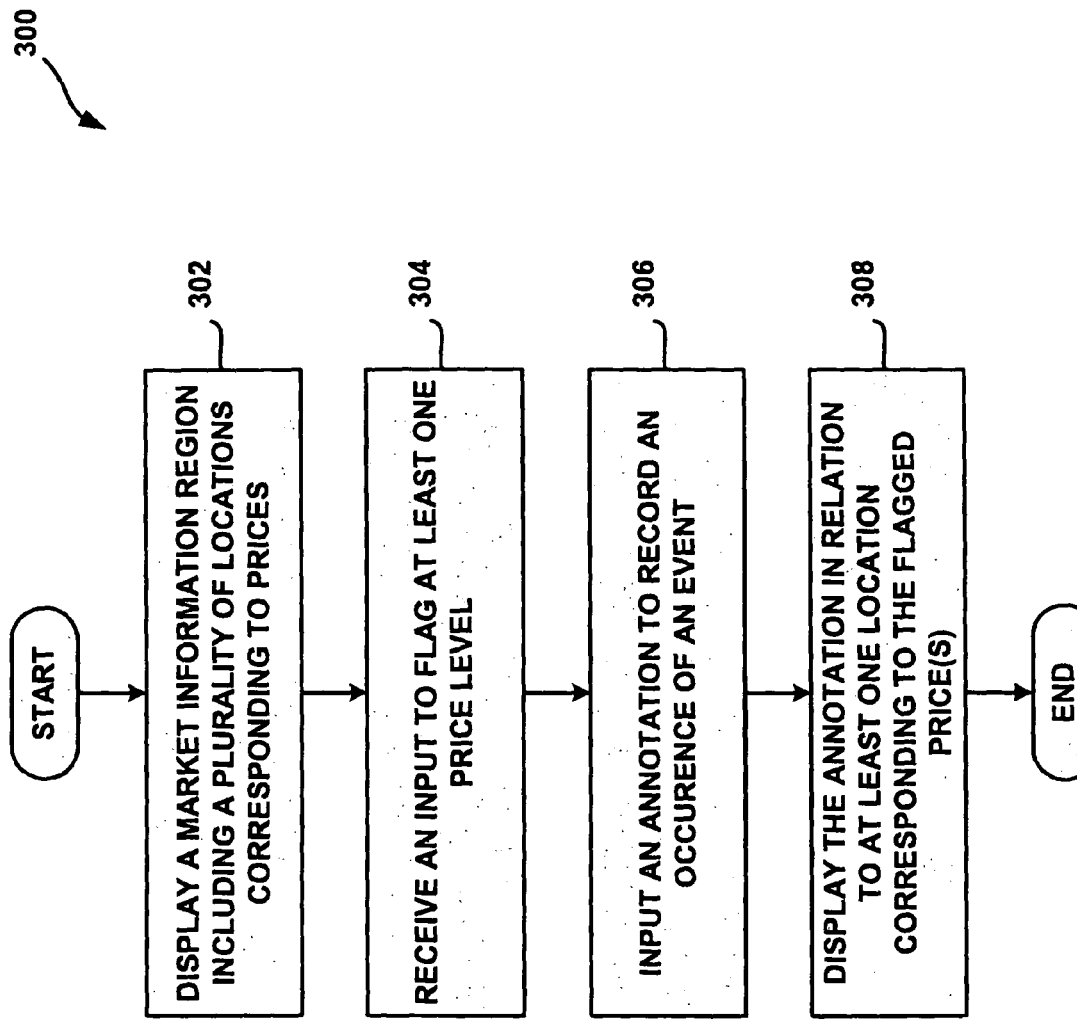
FIG. 3 is a flowchart illustrating an example method for creating price-based annotations in an electronic trading environment.

FIG. 3 is a flow chart illustrating one example method 300 for creating price-based annotations in relation to a trading interface. However, it should be understood that the flowchart in FIG. 3 provides only an illustrative description of one method for the creating price-based annotations, and that more or fewer steps may be included in the flowchart, and the steps may occur in one or more orders that are different from the orders of the steps shown in FIG. 3. In one embodiment, a trading application in combination with an annotation application may perform the steps illustrated in FIG. 3; however, it should be understood that the preferred embodiments can be readily applied to any other trading related application that has an automatic, semi-automatic, or non-automatic order entry system. Further, it should be understood that the steps of the method illustrated in FIG. 3 may be performed by one or more network entities, such as a client device, gateway, and/or exchange, or a combination thereof, using the teachings described herein.

At step 302, a trading interface displays a market information region including a plurality of locations corresponding to prices, an embodiment of which will be described in relation to FIG. 5. At step 304, a trading application and/or an annotation application detects an input to flag at least one price level. It should be understood that the input may take many different formats including detecting a predetermined key combination input first and then detecting a selection of a predetermined location on the trading interface corresponding to the price level to be flagged. Alternatively, a trader may flag a price level via an annotation interface, an example of which will be described in reference to FIG. 4.

Once a trader selects a price level, at step 306, a trader may input an annotation to record an occurrence of an event. For example, in an embodiment where a trader flags a price level via a trading interface, the trading interface may dynamically display a graphical interface, such as a popup window, that a trader may use to input a desired annotation. Alternatively, in an embodiment where an annotation interface is used, a trader may input annotations in relation to price levels being displayed via the annotation interface. At step 308, once the trader inputs the annotation, the trading application and/or the annotation application link the annotation to the predetermined price level, and the annotation may be displayed in relation to one or more locations corresponding to the flagged price levels, the embodiments of which will be described in reference to FIGS. 5 and 6. Also, as mentioned in earlier paragraphs, the process described in FIG. 4 may be automated, whereas when a preset event is detected, the annotation application may automatically generate an annotation and then link to some price level based on any user-configured conditions.

Figure 4:
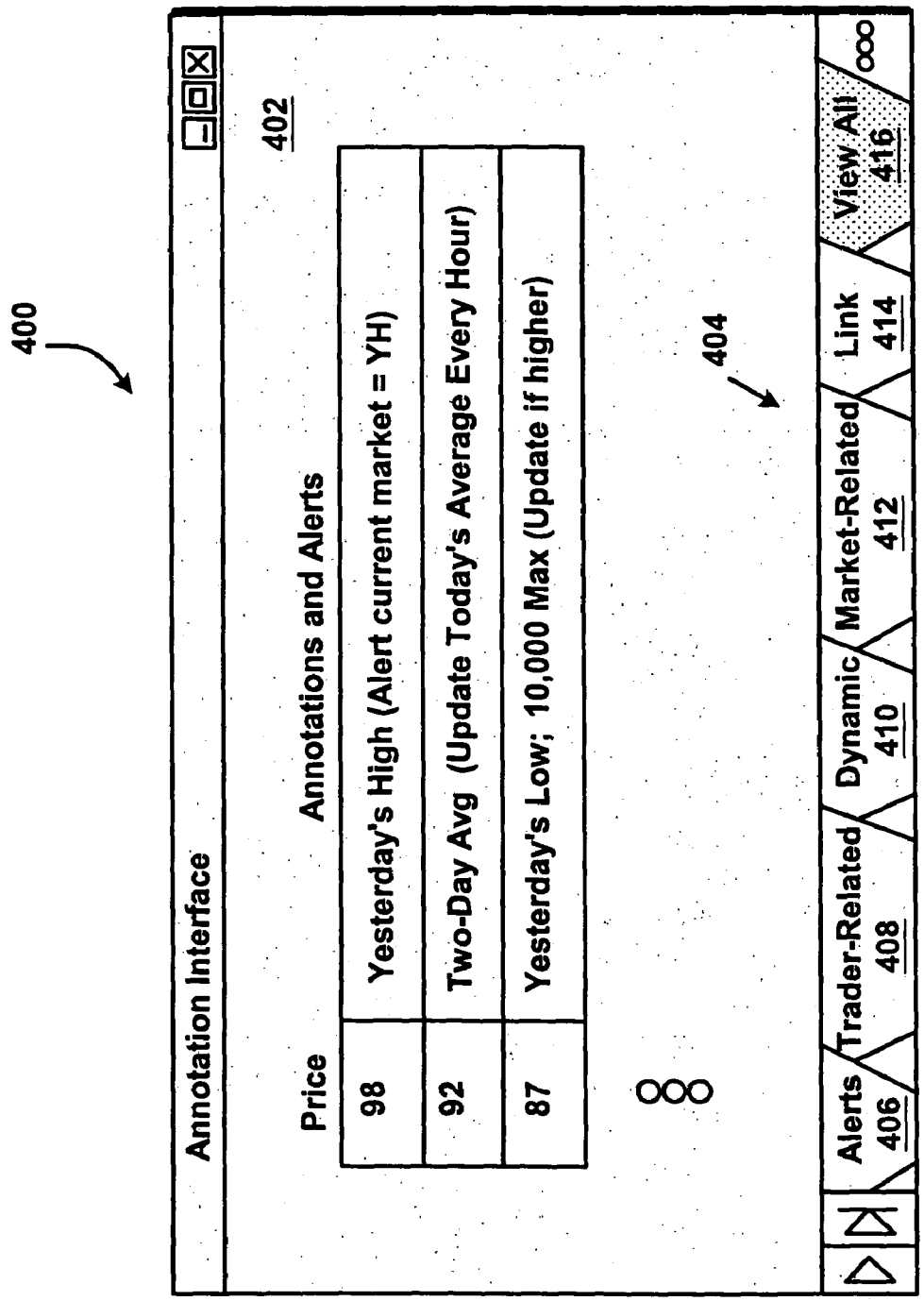
FIG. 4 is a block diagram illustrating one example trading interface that may be used to display annotations according to one example embodiment.

FIG. 4 is a block diagram illustrating an example annotation interface 400 that may be used to create annotations and to configure alerts in an electronic or semi-electronic trading environment.

The annotation interface 400 allows a trader to enter trader-related, market-related, or other types of annotations in relation to specific prices corresponding to a tradeable object being traded by the trader. The annotations corresponding to specific prices may then be displayed in relation to specific prices via a trading screen display, such as an MD Trader™-style display, which displays information, such as orders to buy or orders to sell, in association with price levels arranged along a common-static axis or scale of prices, the embodiments of which will be further described in relation to subsequent figures. It should be understood that, in a preferred embodiment, the static axis of prices displays prices; however, alternatively, prices do not need to be displayed.

The annotation interface 400 includes a user entry area 402 and a number of subject matter icons 404. The user entry area may be provided with a predetermined document entry format having one or more user entry locations. For example, the user entry area 402 may take a tabular format having one or more user entry locations. As illustrated in FIG. 4, the user entry area 402 includes a price column and an annotation/alert column. The price column includes a number of prices corresponding to a tradeable object for which a trader may wish to create the annotations. Alternatively, for automatically generated annotations, rather than having specific price levels, the price column may include any user configurable formulas, based on which the annotation application may determine a price level at which to display an annotation. In such an embodiment, the price column may define a command to display the annotation at the last traded price at the time when the automatic annotation is detected.

In one embodiment, a trading interface may include a graphical selection input that enables a trader to activate the annotation interface 400. When a trader activates the annotation interface 400 via the trading interface, the prices corresponding to the activated tradeable object may be automatically mapped to the annotation interface 400. Alternatively, the annotation interface 402 may enable a trader to select a tradeable object, and the annotation interface 402 may then access prices corresponding to the selected tradeable object.

Once the annotation interface 402 displays prices corresponding to a tradeable object, the trader may input an annotation to be displayed in relation to one or more prices, or may flag the prices with some indicators or alerts. The trader may select a specific category of annotations or other actions by selecting one of category icons 404 including an alert category 406, a trader-related annotation category 408, a dynamic change category 410, a market-related annotation category 412, or a link category 414. For example, once a trader selects the trader-related icon 408 or the market-related icon 412, the trader may then enter any trader-related or market-related annotations to be displayed in relation to one or more prices, respectively. By dividing the trader-related and market-related annotations into two different categories, the annotations associated with each category may be automatically displayed using different annotation patterns or colors selected by a trader.

Also, as mentioned earlier, a trader may configure dynamic annotations that may be automatically updated every time one or more user-configurable conditions are detected. To create such annotations, a trader may select a dynamic annotation icon 410. The selection of the icon 410 may cause the annotation application to display an interface enabling a trader to configure dynamic annotations and to define when the automatic update should be performed. For example, a trader may configure a dynamic annotation to monitor how much time a market spends at some price range during a predetermined time period, such as during the last hour or any other user configurable time period. Alternatively, a dynamic annotation may be associated with a price range associated with the highest trading activity during a predetermined time period. It should be understood that the process of updating dynamic indicators and determining data related to the dynamic indicators may be performed by the annotation application, the trading application, and/or any other external source, based on market data being received from one or more exchanges.

Each dynamic annotation may be also associated with one or more expiration conditions. An expiration condition may include a finite time period, or may be based on a market position compared to an annotation. For example, an expiration time for a dynamic annotation may be based on a tick distance between the price associated with the annotation and the last traded price or the inside market level. Also, for example, a dynamic annotation may be set to expire when a price level associated with the annotation falls outside the price range being displayed via the trading interface.

As mentioned earlier, a trader may wish to be notified of market conditions related to tradeable objects that the trader is not trading at the moment. For example, a trader may realize that there is a correlation between two or more markets and may wish to be notified of certain market conditions related to a first tradeable object or a number of tradeable objects while he is trading a second tradeable object. According to one example embodiment, a trader may use a link annotation icon 414 to link a dynamic annotation associated with one or more tradeable object to a trading interface associated with another tradeable object. For example, a trader may create an annotation to be activated in relation to a trading interface of a first tradeable object when a certain market related event occurs in association with a second tradeable object. For example, a trader may wish to know when the market of the second tradeable object becomes highly volatile, when a new daily high is reached, when a traded volume exceeds a specific, user-configured volume, or when any other conditions occur.

When one or more user configurable events are detected in relation to one or more tradeable objects, annotations corresponding to the detected events may be displayed in relation to one or more prices associated with a linked tradeable object. For example, an annotation could be displayed in relation to the last traded price of the linked tradeable object so that a trader can easily view the movement of the market in relation to the annotation. Also, the annotation may include some text corresponding to the detected event so that a trader can easily distinguish the annotations. Alternatively, as mentioned earlier, price scaling can be used to determine a relative price level of the first tradeable object based on the price level when the event associated with the second tradeable object has been detected.

Also, as illustrated in FIG. 4, a trader may configure a number of alerts by first selecting the alert icon 406 and then defining one or more alerts. For example, the alert icon, when selected, may activate another interface defining all annotations to be displayed in relation to a trading interface. Such implementation may allow a trader to flag the existing annotations with alerts. For example, when an annotation is created for a price level corresponding to a yesterday's high, a trader may wish to create an alert for that price level, and the alert may get activated when the market corresponding to a current trading session reaches the yesterday's high price. In one embodiment, the alert may cause the annotation to start flashing or change colors. It should be understood, however, that the alert may take any user-configurable format, and could take a format of an audio alert. Also, it should be understood that the current market position may be determined based on the last traded price, the highest bid price, the lowest ask price, a mid point between the inside market prices, or any other user-configurable prices.

In another embodiment, a trader could create alerts that are independent of any annotations. For example, alerts may be created to notify a trader of a possibility of a predetermined event happening, such as an alert notifying a trader when the probability of an order getting filled reaches a predetermined percentage level. Alternatively, an alert may be based on any user related parameters that control the user's trading, such as a trader's available credit reaching a predetermined level, a trader completing a predetermined number of trades, or a trader reaching a predetermined net position. For example, a trader could configure an alert to be activated when the trader is approaching his credit limit so that the trader will know ahead of time that his available credit has decreased to a predetermined low level.

Once a trader configures annotations and/or alerts for a tradeable object, the trader may view all configured annotations and alerts in relation to their prices by selecting View All icon 416 that may then cause a display of an interface window such as the one illustrated in FIG. 4. The interface 402 displays three price levels corresponding to one or more annotations and/or alerts. For example, the price level of 98 corresponds to an annotation of a "Yesterday's High" and also to an alarm that will be activated when the current market reaches the Yesterday's High. Then, the price level of 92 corresponds to an annotation of a "Two-Day Avg.," and a dynamic annotation that tracks a today's average price and updates such a price every hour. The price level of 87 is associated with two annotations: a "Yesterday's Low" and a "10,000 Max," where the second annotation is updated every time a new maximum order quantity is detected. In one embodiment, the 10,000 Max may correspond to the maximum number of contracts that have been traded during a current trading day, or during any number of previous trading days. FIG. 4 displays three price levels; however, it should be understood that more price levels could be displayed if more annotations are created for different price levels. Also, it should be understood that different categories of available annotations could be created as well.

Once the trader configures desired annotations, the annotations may be displayed in relation to a trading interface. FIG. 5 is a block diagram illustrating one example trading interface 500 that may be used to display annotations according to preferred embodiments. The trading interface 500 displays market information via a market information region, such as current Bid Quantities 504 and Ask Quantities 506, as well as trader-related information, such as trader's Working Orders 502, along a price axis 508. The price axis 508 and variations thereof are described in the above incorporated U.S. patent application Ser. No. 09/590,692, entitled "Click Based Trading With Intuitive Grid Display of Market Depth," and in U.S. patent application Ser. No. 10/376,417, entitled "A System and Method for Trading and Displaying Market Information in an Electronic Trading Environment."

In general, price values being displayed along the price axis 508 are statically displayed such that the price levels do not normally change positions unless a recentering, repositioning, or other user initiated command is received. The market information display regions, such as the bid and ask display regions, are associated with a plurality of locations arranged such that each location corresponds to a predetermined price level. Also, the indicators displayed in such regions, such as indicators in the bid quantity display region 504 and the ask quantity display region 506, are dynamic. For example, the indicators may move up and down along the price axis 508 to reflect the inside market and/or market depth for a given tradeable object. Then, for example, when the inside market moves up in price, quantities populate appropriate price levels, which using the preferred display, show that the inside market has just moved up. Similarly, when the inside market moves down in price, quantities populate the appropriate price levels, which using the display, show that the inside market has just moved down. Additionally, quantity values displayed in the bid and ask regions 504, 506 are dynamic in the sense that the actual quantity itself may go up or down in magnitude at a particular price level. Regardless of whether the price axis is straight, curved, horizontal, vertical, or oriented at any angle, the display and trading methods of the present embodiments preferably allow the trader to better and quicker visualize market movement.

Once a trader configures desired annotations for a tradeable object, the trading interface 500 may display the annotations in relation to one or more price levels. The annotations shown in FIG. 5 correspond to the annotations that have been described in reference to FIG. 4. More specifically, an annotation 510 corresponding to a Yesterday's High is displayed in relation to the price level of 98, an annotation 514 corresponding to a "Two Day Average" is displayed in relation to the price level of 92, and an annotation 516 corresponding to a Yesterday's Low and a 10,000 Max is displayed in relation to the price level of 87.

In addition to the annotations related to the tradeable object that can be traded via the trading interface 500, the annotations corresponding to different tradeable objects could be linked to and displayed in relation to the trading interface 500. Thus, as shown in FIG. 5, the tradeable object associated with the trading interface 500 is linked to an event corresponding to breaking a yesterday's high associated with a tradeable object Y. Once such an event is detected, the trading interface 500 may display an annotation 512 notifying a trader that the event has been detected.

Figure 5:
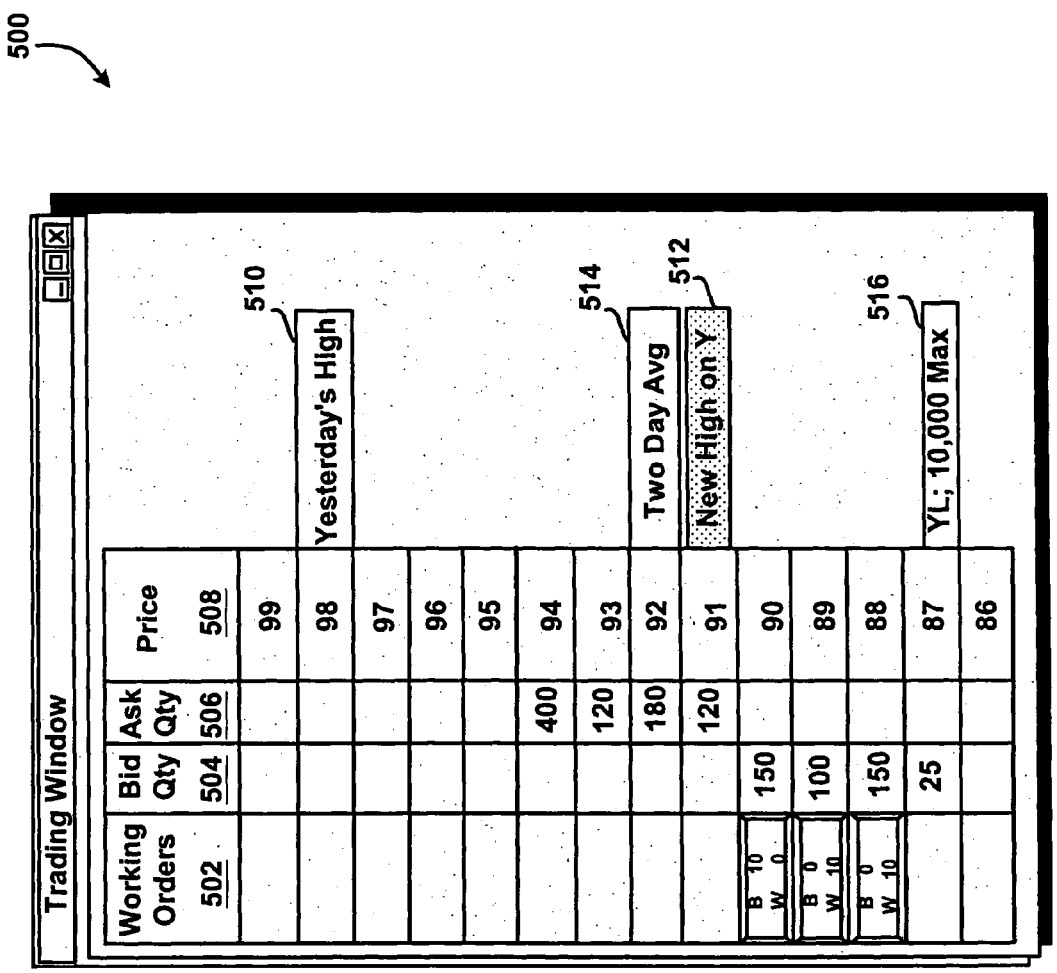
FIG. 5 is a block diagram illustrating a trading interface that may be used to display annotations according to another example embodiment.

It should be understood that FIG. 5 illustrates only one example of many possible annotation formats. It should be understood that a trader could create his own abbreviations of the annotations. Alternatively, a trader could develop a set of indicators, and each indicator could correspond to a predetermined annotation type. Also, a trader could define a number of rules that may be used to control how long each annotation is displayed via a trading interface. For example, different annotation types may be associated with different expiration time periods.

Figure 6:
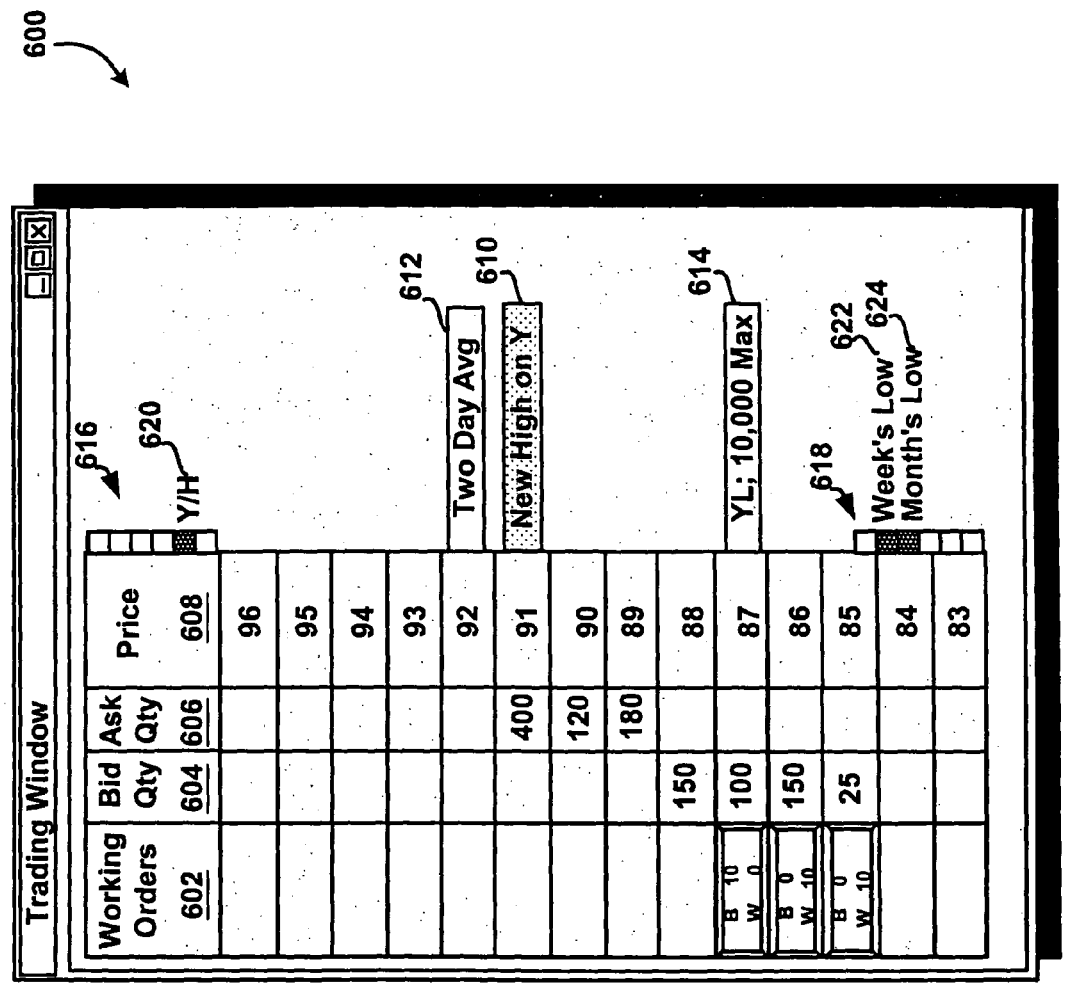
FIG. 6 is a block diagram illustrating a trading interface that may be used to display annotations according to another example embodiment.

Also, as shown in FIG. 5, the trading interface 500 displays a limited number of price levels, and a trader may, for example, reposition the price axis so that the price axis is centered around the inside market or any other item of interest. After such repositioning, some price levels with the corresponding annotations may be positioned outside the price display region. A trader, however, may still wish to view a current market's position in relation to any significant annotations that are outside of the viewable prices. In one embodiment, the annotations corresponding to price levels outside the viewable price area may be consolidated and displayed in relation to another scale-like column. FIG. 6 is a block diagram illustrating a trading interface 600 that may be used to display annotations according to one example embodiment. The trading interface 600 displays the annotations that have been described in reference to FIG. 5 in relation to the repositioned price axis associated with the trading interface 600. More specifically, the annotations including the New High on Y, Two Day Avg., YL/10,000 Max are displayed as annotations 610, 612, and 614, respectively.

As mentioned earlier, some price levels associated with annotations may be outside the viewable area once the price axis is repositioned. Referring back to the example in FIG. 5, the price level of 98 corresponding to the annotation of Yesterday's High is outside the viewable area. According to one example embodiment, such annotations may be displayed in relation to one or more graphical interfaces corresponding to prices outside the viewable area. FIG. 6 displays interfaces 616 and 618 that may be used to display annotations outside the viewable area.

The interfaces 616 and 618 are displayed in relation to the highest and lowest viewable price levels, respectively. However, it should be understood that the interfaces 616 and 618 could be positioned at any location on the trading interface. For example, a trader may be able to drag the interfaces 616 and 618 to any desirable locations. Since the annotation corresponding to the Yesterday's High 620 is associated with the price level of 98 that is positioned outside the viewable area, it is displayed in relation to the interface 616. Also, as illustrated in FIG. 6, the interface 618 displays two additional annotations a Week's Low 622 and a Month's Low 624 that have not been described in relation to the interface described in reference to FIG. 5 since the price levels corresponding to these annotations were outside the viewable area. In one embodiment, the positions of annotations on the interfaces 616 and 618 may relate to price levels corresponding to each annotation. For example, referring to the interface 618, the trader may quickly determine that the price level corresponding to the annotation 624 is lower than the price level associated with the annotation 622. Also, it should be understood that each annotation displayed in relation to the interfaces 616 and 618 may be displayed in combination with a corresponding price level, such as "Y/H @ 98," or in any other user configurable format.

Also, in an alternative embodiment mentioned earlier, rather than having a separate interface for inputting annotations, such as the one described in reference to FIG. 4, a trader could input annotations in relation to specific price levels directly via the trading interface 500 or 600. For example, as mentioned in reference to the flowchart in FIG. 3, a trader could first flag a price and then enter a predetermined user selection input, such as a predetermined key combination input, to activate a popup window that may be used by the trader to input an annotation in relation to the flagged price level. It should be understood that rather than flagging a price level first, a trader could activate an annotation popup window first and then drag it to a desired price level.

It should be understood that the annotations may be displayed in relation to or may overlay other market related data, such as any charts or other trader related graphical interfaces. In such an embodiment, the annotations may be transparent so that a trader can view both the annotations as well as an underlying charts displayed in relation to the price axis.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, the present invention is not limited to the annotations or annotation inputs described hereinbefore, and those skilled in the art will understand that different annotations as well as annotation input methods could also be used.

It will be apparent to those of ordinary skill in the art that methods involved in the system and method for price based annotations in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for displaying price-based annotations in an electronic trading environment, the method including:

displaying via a computing device a price axis, wherein the price axis includes a plurality of price levels for a tradeable object;

displaying via the computing device market data related to the tradeable object, wherein the market data is displayed along the price axis, wherein the market data includes bid and ask quantities for the tradeable object;

displaying via the computing device a plurality of order entry regions, wherein each order entry region corresponds to a price level of the plurality of price levels, where each order entry region is adapted to receive a command to place an order for the tradeable object at the corresponding price level;

receiving via the computing device a definition for an annotation, wherein the definition includes an annotation price level and annotation information, wherein the definition is specified by a user, wherein the annotation price level includes at least one price level for the tradeable object;

processing via the computing device the definition to determine that at least one of the price levels of the annotation price level is within the plurality of price levels of the price axis; and displaying via the computing device the annotation by displaying the annotation information along the price axis at the at least one of the price levels of the annotation price level determined to be within the plurality of price levels of the price axis.

2. The method of claim 1, wherein the definition includes an event associated with the tradeable object.

3. The method of claim 2, wherein the event comprises a market event.

4. The method of claim 3, wherein the market event is associated with historical data.

5. The method of claim 2, further comprising:
detecting via the computing device an occurrence of the event at a second price level; and
dynamically updating the display of the annotation to display the annotation information along the price axis at the second price level.

6. The method of claim 2, further comprising:
detecting via the computing device an occurrence of the event at a second price level; and
displaying via the computing device the annotation by also displaying the annotation information at the second price level.

7. The method of claim 1, wherein the annotation information includes a graphical indicator.

8. The method of claim 7, wherein the graphical indicator further includes a text message corresponding to an event.

9. The method of claim 1, wherein the annotation price level is determined based on a second tradeable object.

10. The method of claim 1, further including:
displaying via the computing device a working order indicator, wherein the working order indicator corresponds to an order placed by the user for the tradeable object at an order entry region, wherein the working order indicator is displayed along the price axis at the corresponding price level.

11. The method of claim 1, further including:
displaying via the computing device a consolidated price interface, wherein the consolidated price interface represents a second plurality of price levels, wherein the second plurality of price levels is not within the plurality of price levels of the price axis, wherein a second annotation price level for a second annotation is within the second plurality of price levels; and
displaying via the computing device second annotation information for the second annotation along the consolidated price interface at a location corresponding to the second annotation price level.

12. A computer readable medium having stored therein computer executable instructions to execute a method comprising:
displaying via a computing device a price axis, wherein the price axis includes a plurality of price levels for a tradeable object;
displaying via the computing device market data related to the tradeable object, wherein the market data is displayed along the price axis, wherein the market data includes bid and ask quantities for the tradeable object;
displaying via the computing device a plurality of order entry regions, wherein each order entry region corresponds to a price level of the plurality of price levels, where each order entry region is adapted to receive a command to place an order for the tradeable object at the corresponding price level;
receiving via the computing device a definition for an annotation, wherein the definition includes an annotation price level and annotation information, wherein the definition is specified by a user, wherein the annotation price level includes at least one price level for the tradeable object;
processing via the computing device the definition to determine that at least one of the price levels of the annotation price level is within the plurality of price levels of the price axis; and
displaying via the computing device the annotation by displaying the annotation information along the price axis at the at least one of the price levels of the annotation price level determined to be within the plurality of price levels of the price axis.

13. The computer readable medium of claim 12, wherein the definition includes an event associated with the tradeable object.

14. The computer readable medium of claim 13, wherein the event comprises a market event.

15. The computer readable medium of claim 14, wherein the market event is associated with historical data.

16. The computer readable medium of claim 13, further comprising instructions for:
detecting via the computing device an occurrence of the event at a second price level; and
dynamically updating the display of the annotation to display the annotation information along the price axis at the second price level.

17. The computer readable medium of claim 13, further comprising instructions for:
detecting via the computing device an occurrence of the event at a second price level; and
displaying via the computing device the annotation by also displaying the annotation information at the second price level.

18. The computer readable medium of claim 12, wherein the annotation information includes a graphical indicator.

19. The computer readable medium of claim 18, wherein the graphical indicator further includes a text message corresponding to an event.

20. The computer readable medium of claim 12, wherein the annotation price level is determined based on a second tradeable object.

21. The computer readable medium of claim 12, further including instructions for:
displaying via the computing device a working order indicator, wherein the working order indicator corresponds to an order placed by the user for the tradeable object at an order entry region, wherein the working order indicator is displayed along the price axis at the corresponding price level.

22. The computer readable medium of claim 12, further including instructions for:
displaying via the computing device a consolidated price interface, wherein the consolidated price interface represents a second plurality of price levels, wherein the second plurality of price levels is not within the plurality of price levels of the price axis, wherein a second annotation price level for a second annotation is within the second plurality of price levels; and
displaying via the computing device second annotation information for the second annotation along the consolidated price interface at a location corresponding to the second annotation price level.

* * * * *